United States Patent
Meyerhoff, II

(10) Patent No.: US 7,580,880 B2
(45) Date of Patent: Aug. 25, 2009

(54) SYSTEM, METHOD AND COMPUTER PROGRAM PRODUCT FOR ADMINISTERING SECURITIES FUNDED BY A MUNICIPAL ARBITRAGE PORTFOLIO (MAP)

(75) Inventor: Joseph Meyerhoff, II, Owings Mills, MD (US)

(73) Assignee: Meyerhoff Investment Holdings, LLC., Baltimore, MD (US)

( * ) Notice: Subject to any disclaimer, the term of this patent is extended or adjusted under 35 U.S.C. 154(b) by 0 days.

(21) Appl. No.: 12/121,646

(22) Filed: May 15, 2008

(65) Prior Publication Data

US 2008/0288387 A1 Nov. 20, 2008

Related U.S. Application Data

(60) Provisional application No. 60/917,949, filed on May 15, 2007.

(51) Int. Cl.
G06Q 40/00 (2006.01)
(52) U.S. Cl. ........................................ 705/36 R; 705/35
(58) Field of Classification Search ................. 705/35, 705/39, 36 T, 36 R
See application file for complete search history.

(56) References Cited

U.S. PATENT DOCUMENTS 6,070,151 A * 5/2000 Frankel ..................... 705/36 R
6,338,047 B1 * 1/2002 Wallman ................... 705/36 R
2004/0249736 A1 12/2004 Curry et al.
2006/0085324 A1 4/2006 Laubacher
2006/0155625 A1 7/2006 Bunkin et al.
2008/0021819 A1 * 1/2008 Whang ........................ 705/39

OTHER PUBLICATIONS

Dreyfus Intermediate Municipal Bond Fund, <http://www.dreyfus.com/compliance/pdf/sai/0947_sai.pdf>, [retrieved May 13, 2008].

* cited by examiner

Primary Examiner—Jagdish N Patel
(74) Attorney, Agent, or Firm—Venable LLP; Ralph P. Albrecht

(57) ABSTRACT

A system, method, and computer program product for implementing municipal arbitrage portfolios are set forth herein. A first investment fund that is compliant with the Investment Company Act of 1940 (the 1940 Act) uses a special purpose trust that: (i) issues at least a First Security funded at least in part by equity of the first investment fund, the First Security providing a series of residual interest payments to the first investment fund; (ii) issues at least one Second Security that results in a series of distributions to a second investment fund; and (iii) owns one or more municipal bonds. The first investment fund may have an obligation to reimburse a liquidity provider (LP) for losses incurred by the liquidity provider from performing its obligation to purchase the Second Security upon tender by a holder. Consolidation of the municipal bonds held by the special purpose trust on the balance sheet of the first investment fund is avoided by using one or more step out transactions.

19 Claims, 4 Drawing Sheets

SPECIAL PURPOSE TRUST (TENDER OPTION BONDS) – STRUCTURE AND FLOWS

EXEMPLARY MUNICIPAL ARBITRAGE PORTFOLIO (MAP) INCOME

EXEMPLARY COMPUTER PROCESSING

SYSTEM, METHOD AND COMPUTER PROGRAM PRODUCT FOR ADMINISTERING SECURITIES FUNDED BY A MUNICIPAL ARBITRAGE PORTFOLIO (MAP)

CROSS-REFERENCE TO RELATED APPLICATION

The present application claims priority to U.S. Provisional Application No. 60/917,949, filed May 15, 2007, entitled "High Income Municipal Arbitrage Portfolio (HIMAP)," the contents of which are incorporated herein by reference in their entirety.

FIELD OF THE INVENTION

The present invention is generally related to investment funds, and more particularly to investment funds that are compliant with the Investment Company Act of 1940 (the "1940 Act").

SUMMARY OF THE INVENTION

An exemplary embodiment of the present invention is directed to various exemplary systems, methods, and/or computer program products for implementing, managing, and/or administering a Municipal Arbitrage Portfolio (MAP) Fund that is compliant with the 1940 Act, wherein the assets of the MAP Fund are managed by at least one fund manager. There may be one or more manager(s), which could be fund manager(s) or independent third party manager(s), according to exemplary embodiments. A Delaware statutory trust, New York common law trust, or similar trust (the "Trust") is established to hold municipal bonds, the interest on which is excludable from gross income for personal federal income tax purposes. The Trust is established by (i) issuing at least one security (a "First Security") purchased for cash and (ii) the execution of a reimbursement agreement by the MAP Fund. The First Security provides a series of residual interest payments to the MAP Fund. The Trust also issues at least one security (a "Second Security"), which results in a series of distributions to a second investor, often a tax-exempt money market fund. The Second Security may comprise one or more security(ies) that are entitled to certain future payments of principal, interest and premium, if any, on underlying municipal bonds, and the right to tender the Second Security at the face amount plus accrued interest (the "tender option"), payable from remarketing proceeds or from amounts available under a liquidity facility. The Second Security may have a payment priority over the First Security with respect to payments received on the municipal bonds.

The MAP Fund may have an obligation to reimburse a liquidity provider (LP) for losses incurred from performing the LP's obligation to purchase the Second Security upon tender by a holder of such Second Security. The obligation to cover such losses may be created using, or imposed pursuant to, one of four exemplary structures:

The first structure is a reimbursement agreement between the liquidity provider and the MAP Fund. The reimbursement agreement may include provisions that permit the liquidity provider to cause a sale of the underlying municipal bonds or to cause the sale of assets held in a Second Trust (the "Second Trust") which holds the First Security and other investment securities if criteria specified in the reimbursement agreement are not met.

The second structure is a shortfall swap agreement between the liquidity provider and the MAP Fund. Pursuant to the shortfall swap agreement, to the extent that the liquidity provider cannot recover its losses from a sale of the municipal bonds underlying the Trust, the MAP Fund would pay an amount to the liquidity provider equal to the shortfall amount. In some embodiments, a Second Trust will act as counterparty to the shortfall swap agreement.

The third structure corresponds to one or more tri-party agreements between the LP, the MAP Fund and a financial intermediary approved by the LP and the MAP Fund, where the tri-party agreement includes provisions that permit the financial intermediary to hold MAP Fund assets for the benefit of the LP. The LP may enter into a liquidity facility to provide funds for payment of both the face amount and accrued interest distributable on the Second Security under certain circumstances, including the exercise by the holder(s) of the Second Security of the tender option upon the resetting of the Second Security's short term floating rate and upon certain termination events. Any tendered Second Security that is not remarketed is purchased from funds drawn under the liquidity facility. In some exemplary embodiments, a Second Trust may act as counterparty to the tri-party agreement, rather than the MAP Fund.

The fourth structure is a non-recourse obligation of the MAP Fund.

The MAP Fund may hedge interest rate or other risks inherent in the First Security and reimbursement obligations by entering into swap agreements or other derivatives to the extent permitted by the 1940 Act or by investing in one or more of the following instruments: exchange traded futures, exchange traded options and exchange traded U.S. Treasury obligations.

Consolidation on the balance sheet of the MAP Fund, of the municipal bonds held by the Trust, is avoided by using one or more step out transactions that ensure(s) that brokers or the Trust, acting on instructions from a manager of the MAP Fund, or from the MAP Fund itself, act only as principals for the benefit of the Trust and not as agents for the MAP Fund manager and/or the MAP Fund.

In some exemplary embodiments, the First Security may be a Residual Trust Certificate (RTC) and the Second Security may be a short term, Floating Rate (Floater) or Fixed Rate Trust Certificate.

BRIEF DESCRIPTION OF THE DRAWINGS

The foregoing and other features and advantages of the invention will be apparent from the following, more particular description of exemplary embodiments of the invention, as illustrated in the accompanying drawings. In the drawings, like reference numbers generally indicate identical, functionally similar, and/or structurally similar elements. The drawing in which an element first appears is indicated by the leftmost digits in the corresponding reference number. A preferred exemplary embodiment is discussed below in the detailed description of the following drawings.

DETAILED DESCRIPTION OF VARIOUS EXEMPLARY EMBODIMENTS

Figure 1:
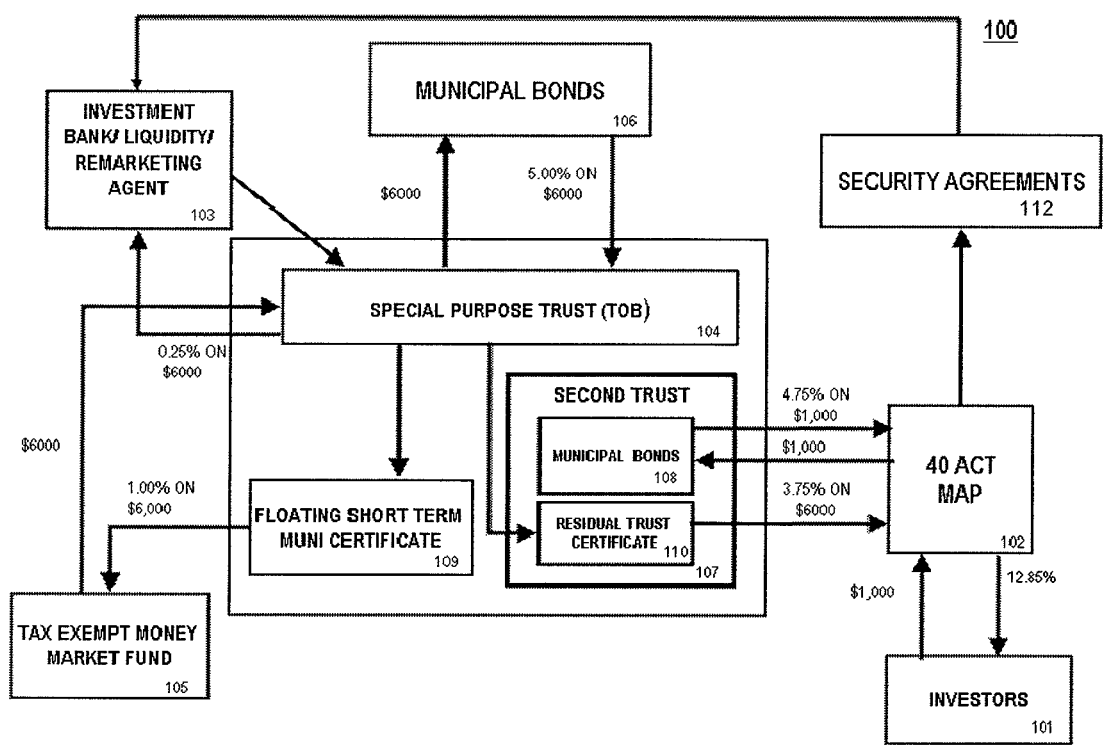
FIG. 1 depicts an exemplary diagram illustrating an exemplary embodiment of a structure and flow for implementing an exemplary investment fund, in accordance with an exemplary embodiment of the present invention.

Various exemplary embodiments are discussed in detail below including a preferred embodiment. While specific implementations are discussed, it should be understood that this is done for illustration purposes only. A person skilled in the relevant art can recognize that other components, configurations, accounting data, and ratios may be used without parting from the spirit and scope of the invention.

EXEMPLARY DEFINITIONS

The London Interbank Offered Rate (LIBOR)—According to an exemplary embodiment, LIBOR is a daily reference rate based on the interest rates at which banks offer to lend unsecured funds to other banks in the London wholesale money market (or interbank market). LIBOR may normally be slightly higher than the London Interbank Bid Rate (LIBID), the rate at which banks are prepared to accept deposits.

Municipal bond arbitrage (also called municipal bond relative value arbitrage, municipal arbitrage, or just muni arb)—According to an exemplary embodiment, municipal bond arbitrage may generally include building an economically leveraged portfolio of high-quality, tax-exempt municipal bonds and simultaneously hedging the duration risk in that municipal bond portfolio by selling short the equivalent taxable corporate bonds. These corporate equivalents may typically include interest rate swaps referencing LIBOR or Securities Industry Financial Markets (SIFMA). Muni arb is generally a relative value strategy based on the fact that interest on municipal bonds is exempt from personal federal income tax. Because the source of this arbitrage is artificially imposed by government tax policy, it has persisted (i.e., it has not been "arbitraged away") for decades. The arbitrage manifests itself in the form of a relatively cheap longer maturity municipal bond, which may be, e.g., but is not limited to, a municipal bond that yields significantly more than a corresponding (same maturity, same quality) taxable corporate bond. The steeper slope of the municipal yield curve may allow participants to collect more after-tax income from the municipal bond portfolio than is spent on the interest rate swap. As a result, the carry is greater than the hedge expense. Positive, tax-free carry can reach into the double digits, according to an exemplary embodiment. The strategy in municipal bond arbitrage is that, over a longer period of time, two similar instruments—municipal bonds and interest rate swaps—will correlate with each other. They are both very high quality credits, have the same maturity and are denominated in U.S. dollars. Credit risk and duration risk are largely eliminated in this strategy. However, basis risk arises from use of an imperfect hedge, which results in significant, but range-bound principal volatility. The end goal is to limit this principal volatility, eliminating its relevance over time as the high, consistent, tax-free cash flow accumulates.

Trust or Special purpose trust (SPT)—A SPT is a single purpose legal entity. Its purpose is to issue or sell two classes of securities to investors. The SPT purchases municipal bonds and then issues (i) certificates that receive distributions based on a short term floating rate (generally called "Floaters") and (ii) Residual Trust Certificates ("RTCs"). The SPT is responsible for accounting for and allocating both interest and principal and gain or loss from the underlying bonds to the holders of the two classes of securities. The floaters are paid a short term interest rate that is generally reset weekly or monthly. Any residual interest available after payment of the floaters and all other fees associated with the SPT are paid out to the holder of the RTC. The SPT usually employs a Trustee, a Liquidity agent and a Remarketing agent.

Second Security or Short Term Certificates ("Floaters")—Floaters are short term certificates that are usually purchased by 1940 Act Rule 2 (a) (7) qualified tax exempt money market funds. The interest rates paid by these certificates are generally reset weekly or monthly. Additional features of Floaters include that they can be tendered for their face amount, plus accrued interest plus a portion of the gain share in the underlying municipal bonds at regular intervals. In addition, the face amount plus accrued interest of the Floaters is supported by a liquidity provider.

First Security or Residual Trust Certificates ("RTCs")—RTCs are one of two securities issued and sold by the SPT. The characteristics of RTCs are that they receive any residual interest available from the underlying bonds after all expenses and senior distributions of the SPT are paid, including interest distributable to the Floaters. Additionally, the holders of the RTCs generally reimburse the liquidity provider for any losses incurred by the liquidity provider.

An Overview of an Exemplary Embodiment of a Special Purpose Trust (Tender Option Bonds)—Including Exemplary Structure and Flows FIG. 1 depicts an exemplary diagram 100 illustrating an exemplary embodiment of a Special Purpose Trust 104 with an exemplary structure and exemplary flows. Diagram 100, according to an exemplary embodiment, illustrates retail investors 101 who may invest cash or other investments in a 1940 Act fund 102. According to an exemplary embodiment, an investor may invest in a mutual fund instrument using any of various conventional processes and methods including using a computer hardware and software system to invest funds, to acquire the exemplary financial instruments. According to an exemplary embodiment, the 1940 Act fund 102 may notify, using an exemplary computer system, an Investment Bank ("IB")/Liquidity Provider (LP)/Remarketing Agent 103 that the 1940 Act fund 102 may wish to purchase RTCs 110. The IB/LP 103 may create a Special Purpose Trust ("SPT") 104, which may be bankruptcy remote according to an exemplary embodiment. The SPT 104 may be managed using a computer hardware/software system 400, not shown, but described further below with reference to FIGS. 3 and 4, according to an exemplary embodiment. According to an exemplary embodiment, other investors (not shown) may have placed invested assets in a separate tax exempt money market fund ("MMF") 105. According to an exemplary embodiment, retail investors who may invest cash or other investments in MMF 105. According to an exemplary embodiment, an investor may invest cash or other investments in MMF 105 using any of various conventional processes and methods including using a computer hardware and software system to invest funds, to acquire the exemplary financial instruments. According to an exemplary embodiment, the IB 103 may contact the tax exempt MMF 105, which may indicate a desire of the tax exempt MMF 105 to invest in short term money market certificates ("Floaters") 109. According to an exemplary embodiment, the MMF 105 may invest, according to an exemplary, but non-limiting embodiment, 6,000 into the SPT 104. The SPT 104, according to an exemplary embodiment, may then purchase 6,000 of Municipal Bonds 106. As part of the transaction, the Liquidity provider (LP) 103 may require the 1940 Act fund 102 to invest additional capital into a structure that may meet the financial and legal requirements of the LP 103 (the reimbursement obligations may be pursuant to e.g., but not limited to, a shortfall swap agreement, a reimbursement agreement, and/or a tri-party agreement.) According to an exemplary embodiment, additional capital may be reimbursed by the MAP fund pursuant to obligations to reimburse losses incurred by the LP 103 for performing its obligations to purchase the Second Securities upon tender by a holder, imposed pursuant to obligations under any of several exemplary security agreements. According to an exemplary embodiment, the additional capital reimbursement obligations may be imposed pursuant to obligations of, e.g., but not limited to, a shortfall swap agreement, a reimbursement agreement, or a tri-party agreement. The additional investment of capital into the structure may be accomplished, according to an exemplary embodiment, by the 1940 Act fund 102 purchasing additional municipal bonds 108 which may be placed in a Second Trust 107. According to an exemplary embodiment, the SPT 104 may then issue two forms of securities, the Floaters 109 and Residual Trust Certificates ("RTCs") 110, according to an exemplary embodiment. According to an exemplary embodiment, the Floaters 109 may be issued to the MMF 105, and the RTCs 110 may be issued to the 1940 Act fund 102. According to an exemplary embodiment, the RTCs 110 may be deposited into the Second Trust 107 for the benefit of the 1940 Act Fund 102. According to an exemplary embodiment of the invention, the 1940 Act Fund 102 may enter into any of several security agreements 112 with the LP 103 using, e.g., but not limited to, a shortfall swap agreement, a reimbursement agreement, and/or a tri-party agreement.

Figure 2:
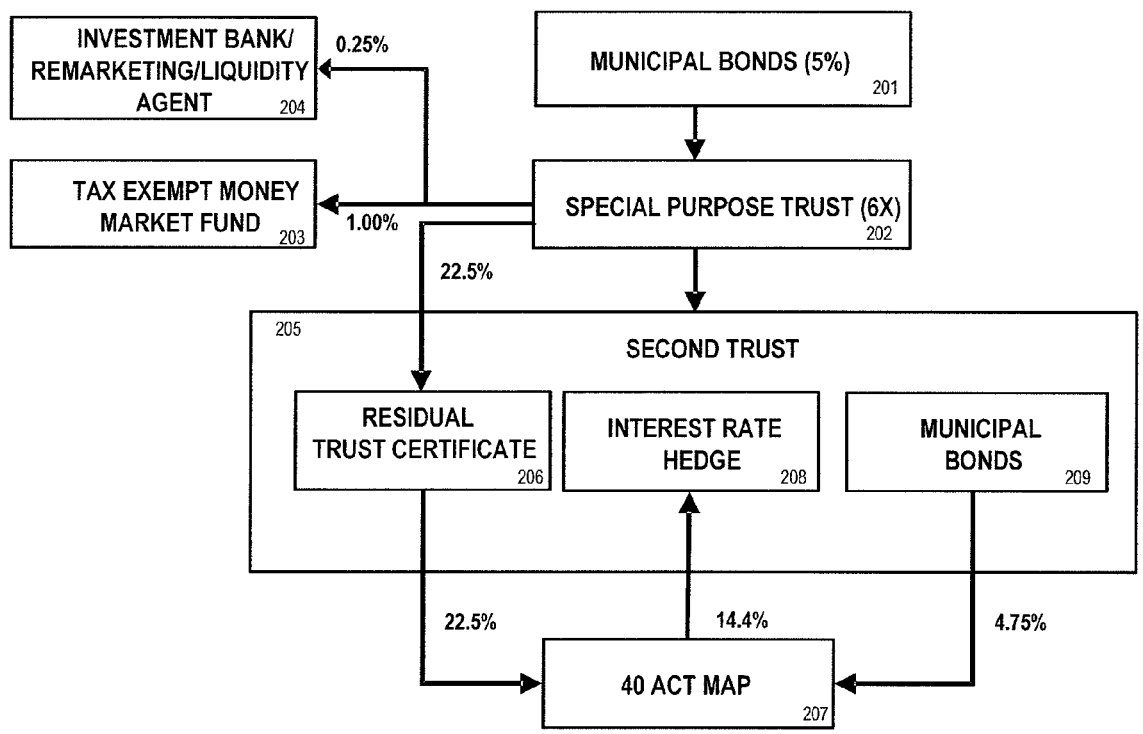
FIG. 2 is an exemplary diagram illustrating an exemplary embodiment of a process of investing hypothetical investment income from an exemplary municipal arbitrage portfolio, in accordance with an exemplary embodiment of the present invention.

Exemplary Embodiment of an Exemplary Hypothetical Investment—Exemplary Municipal MAP Income FIG. 2 depicts a diagram 200 illustrating an exemplary embodiment of an exemplary hypothetical investment generating exemplary municipal arbitrage portfolio (MAP) income, according to an exemplary embodiment. The Municipal Bonds 201 may pay interest and principal into the Special Purpose Trust 202, according to an exemplary embodiment. The SPT 202 may then pay interest to the MMF 203 according to an exemplary embodiment. According to an exemplary embodiment, fees may be charged to the SPT 202 and/or the RTC holder, according to an exemplary embodiment. The Trustee, Liquidity Provider, and Investment Bank, Remarketing agent 204 may charge a fee, according to an exemplary embodiment. Any interest income and principal, after paying all fees and expenses may be paid, according to an exemplary embodiment, to the holders of the Floaters 109 (MMF 105, 203) and the holder of the RTC 206, (the 1940 Act Fund 207, 102), which may have deposited the RTC 206 in a Second Trust 205, in one exemplary embodiment. The 1940 Act Fund 207 may hedge the 1940 Act Fund's interest rate risk and may purchase various hedging instruments 208 which may also be deposited in the Second Trust 205, according to an exemplary embodiment. The municipal bonds 209 that the 1940 Act fund 207 has purchased may also be deposited in the Second Trust 205, according to an exemplary embodiment. According to an exemplary embodiment, all of the assets deposited in the Second Trust 205 for the benefit of the 1940 Act fund 207 may be subject to legal agreements between the Liquidity provider (LP) 204 and the 1940 Act fund 207.

A Detailed Description of Various Exemplary Embodiments

Various aspects and exemplary embodiments of the invention are discussed herein and may be implemented using, e.g., but not limited to, the Trust, a First Security issued by the Trust, a Second Security issued by the Trust, a reimbursement agreement, a shortfall swap agreement, a tri-party agreement, a Second Trust and/or a non-recourse obligation of the MAP Fund. Examples of instruments for establishing such structures, securities and agreements are set forth in Appendices I-VII. It will be understood that the Appendices are exemplary, and not intended to limit the scope of the invention.

Referring to FIG. 1, according to an exemplary embodiment, there is shown an overview of an exemplary structure for implementing a MAP Fund that is compliant with the 1940 Act. Initially, investors 101 may contribute assets (e.g., 1,000) to the MAP Fund 102, according to an exemplary embodiment. These assets may be managed by at least one fund manager, according to an exemplary embodiment. The Trust 104 may issue a First Security (e.g., Residual Trust Certificates (RTCs) 110) that may be funded by the contribution of cash from the MAP Fund 102 to the Trust 104 plus execution of a reimbursement agreement, according to one exemplary embodiment. The First Security(ies) 110 may provide a series of distributions or residual interest payments to the MAP Fund 102, according to an exemplary embodiment. The First Securities (e.g., the RTCs 110) may provide sufficient capital to meet the obligations imposed by the security agreements 112 (such as, e.g., but not limited to, the reimbursement agreement, or the shortfall swap agreement, etc.).

According to an exemplary embodiment, the Trust 104 may also issue at least one Second Security 109 (e.g., a short term floating rate or fixed rate trust certificate) that may be funded by the contribution of cash from a tax exempt money market fund (MMF) 105, that may result in a series of interest payments to the holder of the Second Security, the MMF 105, according to an exemplary embodiment. The Trust 104 may own one or more municipal bonds 106, according to an exemplary embodiment. The municipal bond portfolio may be purchased using monies supplied by the MMF 105, according to an exemplary embodiment. The Second Security 109 may have a payment priority over the First Security 110 with respect to income generated by the portfolio of municipal bonds 106.

The MAP Fund 102, according to an exemplary embodiment, may have an obligation (see security agreement(s) 112) running in favor of a liquidity provider (LP) 103 to reimburse losses of the liquidity provider 103. The obligation to cover such losses may be imposed by security agreements 112, using, e.g., but not limited to, one of four exemplary, but non-limiting structures.

The first structure, according to an exemplary embodiment, may include a reimbursement agreement (an example of which is documented in Appendix IV) between the liquidity provider 103 and the MAP Fund 102. In an exemplary embodiment, the MAP Fund 102 creates a Second Trust 107 to own the First Security 110 and to enter into the reimbursement agreement. A Second Trust 107 may be used in various exemplary embodiments of the invention. The MAP Fund 102 may purchase additional securities 108 (normally municipal bonds) that may be deposited into the Second Trust 107 which will satisfy the provisions of the reimbursement agreement.

The second structure, according to another exemplary embodiment, may include a shortfall swap agreement (an example of which is documented in Appendix V) between the liquidity provider 103 and the MAP Fund 102. To the extent that the liquidity provider 103 cannot recover its losses from a sale of the municipal bonds underlying the Trust 104 that issued the First Security 110 and Second Security 109, pursuant to the shortfall swap agreement, the MAP Fund 102 may pay an amount to the liquidity provider 103 equal to the shortfall. In some embodiments, the Second Trust 107 may act as counterparty to the shortfall swap agreement.

The third structure, according to an exemplary embodiment, may include a tri-party agreement (an example of which is documented in Appendix VI) between the liquidity provider 103, the MAP Fund 102, and a financial intermediary or like entity (not shown) approved by the liquidity provider 103 and the MAP Fund 102. The tri-party agreement may include provisions that permit the financial intermediary to hold MAP Fund 102 assets for the benefit of the liquidity provider 103 to cover defaults under the tri-party agreement.

The fourth structure, according to an exemplary embodiment, is a non-recourse obligation (an example of which is documented in Appendix VII) of the MAP Fund 102.

As illustrated in the exemplary embodiment depicted in FIG. 2, the MAP Fund 102, 207 may hedge, e.g., but not limited to, interest rate 208 and other risks inherent in the First Security 110, 206 or reimbursement obligation by using, e.g., but not limited to, exchange traded futures, options and U.S. Treasury obligations for hedging purposes in order to avoid the 1940 Act Rule 12d3-1 prohibition discussed herein. Swap agreements may also be used to the extent permitted under the 1940 Act.

Consolidation of the municipal bonds issued by the Trust 104, 202 on a balance sheet of the MAP Fund 102, 207 may be avoided by using one or more step out transactions that ensure(s) that brokers or the Trust 104, acting on instructions from a manager or the MAP Fund 102, 207, act only as principals and not as agents for the manager or the MAP Fund 102, 207. The MAP Fund 102, 207 may use tender option bonds ("TOBs") (i.e., investment trusts (such as the Trust 104 described above) that allocate municipal bond income among different classes of securities) as investment vehicles in the 1940 Act environment (e.g., but not limited to, closed end fund, mutual fund, exchange traded fund (ETF). In some exemplary embodiments:

the MAP Fund 102, 207 may be implemented as an individual or sub-advised third party single or multiple manager muni-arbitrage vehicle utilizing managers that specialize in purchasing securities issued by TOB investment programs;

TOB program(s) may be used as the core investment strategy of the MAP Fund 102, 207 (e.g., investments in the Residual Trust Certificates 110, 206 from the TOB programs may constitute, e.g., but not limited to, 5-100% of the holdings of the MAP Fund 102, 207). In some embodiments, the Residual Trust Certificates 110, 206 may constitute a majority of the portfolio.

Some exemplary embodiments of the present invention may execute a TOB program on a recourse basis (e.g., the liquidity provider 103, 204 may have recourse to the MAP Fund 102, 207 to cover all losses) with a slight variation from the market standard recourse trade in that the recognition of capital contributed may be reflected in a Second Trust 107, 205, and may include a reimbursement agreement. Alternatively, the TOB program may be executed on a non-recourse basis. The vehicles and methodologies, according to an exemplary embodiment, eliminate the collateral issue in a 1940 Act fund, because there is no violation of the prohibition against posting of collateral for purposes other than the purchase of exchange traded futures, as set forth in Rule 17(f) under the 1940 Act. According to another exemplary embodiment, tri-party agreements may also be used, which may allow securities subject to Securities Agreements 112 to remain with the custodian of the MAP Fund 102, 207 (e.g., the entity responsible for holding the assets of the 1940 Act fund). The tri-party agreements may be between the liquidity provider 103, 204 and the MAP Fund 102, 207 or Second Trust 107, 205. The tri-party agreement may include, in one exemplary embodiment, agreed-upon terms by which securities owned by the MAP fund for the benefit of the MAP Fund may be subject to provisions of one or more of the shortfall swap agreement or the reimbursement agreement, which could be used to reimburse the liquidity provider 103, 204, for losses incurred from performing the LP's obligations to purchase the Second Securities upon tender by a holder, which could be used to pay amounts owed to the liquidity provider 103, 204. In essence, the third party may act as an independent entity that may enforce the terms in the shortfall swap agreement or reimbursement agreement between the MAP Fund 102, 207 and the liquidity provider 103, 204, according to an exemplary embodiment. It is believed that a recognized independent "1940 Act qualified" party (institutions approved by the SEC to qualify this role) permits the assets to remain with the MAP Fund 102, 207 but to be subject to the terms and conditions that the MAP Fund 102, 207 may enter into with the LP 103, 204, imposed by the security agreements 112 (e.g., the shortfall swap agreement, or the Reimbursement Agreement, etc.).

As shown in the exemplary embodiment of FIG. 2, hedging interest rate risk, among other risks, is an important component of managing the financial risks of owning the First Security 110, 206 and executing a reimbursement agreement, shortfall swap agreement or tri-party agreement. According to an exemplary embodiment, LIBOR or Securities Industry Financial Markets Association (SIFMA, formerly the Bond Market Association (BMA)) swaps may be used for hedging purposes. According to an exemplary embodiment, swap agreements may have a value at cost of more than 5% of a typical fund's underlying value. Under the 1940 Act, this is prohibited due to "securities-related business" or "issuer" limits. A securities related business is defined as "any person that, in its most recent fiscal year, derived 15 percent or more of its gross revenues from securities related activities." There is a prohibition under Rule 12d3-1 under the 1940 Act regarding ownership limits: "Immediately after any such acquisition (of securities), the acquiring company has invested not more than five percent of the value of its total assets in the securities of the issuer." Swap agreements are issued by a securities related business. Therefore, the MAP Fund 102, 207 may, e.g., use exchange traded futures, options and U.S. Treasury obligations for hedging purposes in order to avoid the Rule 12d3-1 prohibition. Swap agreements may also be used to the extent permitted under the 1940 Act.

To avoid FASB 140 consolidation issues on transfer (purchase) of securities, the brokers or the Trust 104, 202 may act only as principals and not as agents for the MAP Fund 102, 207. This is necessary to comply with the 1940 Act limitations on leverage, and may require the use of one or more step out transactions, in an exemplary embodiment. Step out transactions are procedures to ensure that the transfer of the municipal bonds from a seller into the TOB program are done so that the underlying municipal bonds held by the Trust are not consolidated onto the balance sheet of the MAP Fund 102, 207 as if the MAP Fund 102, 207 had acted as principal.

There is a specific exception (FASB 46 as it relates to SEC Regulation S-X, Rule 6-03(c)(1) accounting for their investments in accordance with the specialized accounting guidance in the AICPA Audit and Accounting Guide, Audits of Investment Companies; paragraph 4(e) of this Interpretation states that "an enterprise subject to SEC Regulation S-X, Rule 6-03(c)(1) shall not consolidate any entity that is not also subject to that same rule") that does not require Registered Investment Companies to consolidate variable interest entities (such as, e.g., a TOB program) unless the Trust was also a Registered Investment Company. In an exemplary embodiment of the invention, the MAP Fund 102, 207 is able to fall within this exception because the MAP Fund 102, 207 is a Registered Investment Company and the Trust 104, 202 is not, and is not required to be, registered as an investment company. As a result, no consolidation occurs between the MAP Fund 102, 207 and the Trust 104, 202 or the Trust's underlying securities.

Basic Structure of TOB and Manager's Role in Hedging

Depending upon whether the MAP Fund 102, 207 uses a single manager or a multi-manager strategy, there could be one or more separate accounts constituting the corpus of the MAP Fund 102, 207. The separate accounts are for the benefit of the MAP Fund 102, 207, and serve to meet the diversification test as established by the 1940 Act by using individual accounts and securities rather than a number of managers.

In one exemplary embodiment, the MAP Fund 102, 207 manager(s) may work with a TOB sponsor to agree on a specific bond issue for inclusion in a new tender option bond. A new Trust may be created to buy the municipal bonds. The Trust may be capitalized with two different classes of securities. In some exemplary embodiments, the Second Security(ies) 109 may be referred to as the Floaters 109 and the First Security(ies) 110 may be referred to as Residual Trust Certificates 110, 206. The Floaters 109 may be structured to be purchased by tax exempt money market funds 105, 203 relying on Rule 2a-7 under the 1940 Act because there is a conditional liquidity facility available to the holders of the Second Security(ies) 109.

Recourse Tender Option Bonds (TOB) Exemplary Embodiments

In exemplary embodiments employing a recourse structure, the MAP Fund 102, 207 may purchase Residual Trust Certificates 110, 206 at a value that is the difference between the funds contributed by the holders of the short term floaters 109 and the value of the underlying municipal bonds 106, according to an exemplary embodiment. Additionally, the MAP Fund 102, 207, in an exemplary embodiment, may have entered into a reimbursement agreement with the liquidity provider 103, 204. In one exemplary embodiment, this reimbursement agreement may require the manager to meet mark-to-market losses of the underlying bond portfolio in, e.g., two ways: 1) the MAP Fund 102, 207 may buy short term Floaters 109 to reduce leverage in the Trust 104, 202 or pledge additional municipal bonds to the liquidity provider 103, 204, or 2) the liquidity provider 103, 204 may sell the underlying bonds 106 and that particular Trust 104, 202 may be terminated. These different types of security agreements 112 cover the conditions upon which the MAP Fund 102, 207 would normally have created a collateral account with the liquidity provider.

Hybrid of Non-Recourse/Recourse Embodiments

The non-recourse program leverage may be lower than that of the recourse model, which may result in lower potential returns on the Residual Trust Certificates 110, 206. As a further alternative, a reimbursement agreement that would not result in the need for collateral may be used; however, it may result in investing additional capital into the Second Trust 107, 205 by purchasing additional approved securities or floaters (in either case additional securities would be placed into a Second Trust 107, 205) to ensure that the liquidity provider 103, 204 is willing to continue the TOB program as opposed to liquidating it.

The economics of a TOB 104 allow for the purchase of municipal bonds 106, 201 using funds from short term money market funds 105, 203 and other market participants which provide capital at a lower cost than the interest paid on long term municipal bonds. This may be due to the phenomenon of the steepness of the municipal bond yield-curve. The net interest spread is paid to the holders of the Residual Trust Certificates. The TOB sponsor is usually an investment bank (such as, e.g., J.P. Morgan, etc.) that, either directly or through an affiliate, may act as a liquidity provider/remarketing agent. The Liquidity Provider may receive a fee for this service. A trustee may receive a fee for administering the trust. The fees may be paid directly by the Trust 104, 202 and not by the holders of the Residual Trust Certificates 110, 206, according to an exemplary embodiment.

If the ratio of taxable interest rates to tax exempt interest rates changes, the market value of the underlying municipal bond portfolio may decrease, which may result in the 1940 Act MAP Fund 102 needing additional capital in the recourse model. This risk may be mitigated by the manager entering into interest rate hedges. According to one exemplary embodiment, this can be accomplished with LIBOR swap agreements; however, there is a Rule 12d3-1 limitation issue; hence the managers may use Treasuries, futures or other exchange traded option instruments which are permitted under the 1940 Act. If the underlying bonds in the Trust are experiencing market value deterioration, the hedge may provide positive contribution to the MAP Fund.

Non-Recourse TOB Embodiments

In some embodiments, a non-recourse TOB is used wherein the buyer of the Residual Trust Certificates 110 may purchase the securities (i.e., RTCs 110) subject to meeting terms and conditions required by the liquidity provider 103. Typical leverage inherent in the trade on a non-recourse basis is anywhere from 4x to 9x. In these embodiments, there is no reimbursement agreement, and hence there are lower levels of leverage as the liquidity provider to the transaction has no recourse to the manager.

Summary of the Trade

In some exemplary embodiments, the manager of the MAP Fund may choose the municipal issuer and the exact bonds utilized in a particular Trust. The manager may work with a TOB sponsor to determine whether the program will be accomplished on a recourse or non-recourse basis which, in part, may determine the amount of economic leverage in the TOB program. The amount of leverage may determine the mix of Second and First Securities (e.g., floaters and residual trust certificates, respectively) in the Trust, according to an exemplary embodiment. In an exemplary embodiment, the TOB sponsor may raise funds from the sale of the floaters to tax exempt money market funds and other market participants and the sale of the Residual Trust Certificates to the MAP Fund (or Second Trust). The underlying municipal bonds may be held by the Trust and may pay out principal and interest in accordance with the terms of the Securities issued, according to an exemplary embodiment. Remarketing/liquidity agent and trustee fees may be paid by the Trust or the MAP Fund, and, if any excess remains, it may be paid to the Residual Trust Certificates. The manager of the MAP Fund may buy one or more Residual Trust Certificates from different TOB sponsors, aggregate the exposure, and may hedge market interest rate risk between the floating rates of the Second Security(ies) and the underlying bond portfolio, according to one exemplary embodiment.

The manager of the MAP Fund may hedge the interest rates, according to one exemplary embodiment. To insure compliance with provisions of 1940 Act Rule 12d3-1 pertaining to the use of swap agreements, MAP Fund managers may use, e.g., but not limited to, exchange traded futures, options or Treasuries for hedging, according to an exemplary embodiment. The MAP Fund 102 may hold several assets, including, e.g., but not limited to, Residual Trust Certificates, Treasuries, futures and other hedging instruments, cash and a Second Trust, according to an exemplary embodiment.

The income and gains or losses to the MAP Fund 102, according to an exemplary embodiment, may be generated from: 1) municipal bond interest distributed via the Residual Trust Certificates, 2) gains from the sale of the underlying bonds and losses from amounts paid to the liquidity provider (e.g., in accordance with the security agreements 112), and 3) hedging gains or losses from futures, options and other hedging instruments, and gains, losses and income associated with other securities held in the Second Trust, according to an exemplary embodiment.

In some exemplary embodiments, the managers' fees in the MAP Fund (a 1940 Act compliant structure) may be divided into several categories, including e.g., but not limited to, a base management fee and a fulcrum fee based upon that specific manager's performance.

Residual Trust Certificate Valuation

In some exemplary embodiments, a transparent methodology may be provided for valuing Residual Trust Certificates, which generally do not yet trade in an active market. Lack of trading does not mean that they cannot be valued. As to valuation, the administrator of the MAP Fund may apply the following exemplary methodology, according to an exemplary embodiment:

a) The daily market value (from a third party pricing service) of the municipal bond or bonds underlying a Trust, less the current funding amount of short term floaters, according to an exemplary embodiment, and b) The amount of interest distributable to the Residual Trust Certificate from the underlying bond/bonds after deducting the short term floaters' accrued interest (gain share, if any) as well as all trustee, liquidity and remarketing fees, according to an exemplary embodiment.

Collateral Vs. Pledging Issue

Each TOB may be structured in such a way as to insure that it is in compliance with the 1940 Act whereby MAP Fund 102 assets are used to buy the Residual Trust Certificate 110, instead of posting collateral, according to an exemplary embodiment. Thus, each TOB special purpose trust can be constructed without having to pledge collateral, according to an exemplary embodiment. In particular, in one embodiment, the purchased Residual Trust Certificate may contain sufficient embedded equity for the liquidity provider. For example, managers may enter into either non-recourse TOB structures with no generic reimbursement agreement or shortfall swap agreements, or may have the option of entering into 1940 Act compliant reimbursement agreements, according to exemplary embodiments. The options, according to an exemplary embodiment, have advantages and disadvantages which impose certain constraints on the manager's investment flexibility. The third option is the creation of tri-party agreements which are 1940 Act compliant.

Consolidation (Under FAS 140)

If the TOB special purpose trust is improperly constructed, there may be a FAS 140 consolidation issue. That is, the MAP Fund would need to book the value of the Residual Trust Certificates and the gross value of the underlying municipal bonds as an asset as well as the value of the Floaters as a liability which would create balance sheet leverage for the MAP Fund. In some exemplary embodiments, in order to ensure that the purchase of Residual Trust Certificates by the MAP Fund will not result in the need to recognize the gross value and floater liability, the MAP manager(s) may be prohibited from deviating from the approved TOB creation policies, use of approved TOB sponsors, and/or deviating from approved step out transactions. One example of an aspect of such a policy may be that the TOB Sponsor has to be a principal as opposed to an agent in the establishment of the TOB program. Other policies are possible, provided that they are consistent with the step out methodology discussed above.

An Exemplary Computer Methodology of Managing RTCs

To purchase and value RTCs an exemplary embodiment of the invention may use computer technology such as, e.g., but not limited to, computer hardware, processors, software, storage devices, communications technology, database management tools, a database, financial software, and/or data transmission, according to an exemplary embodiment.

Figure 3:
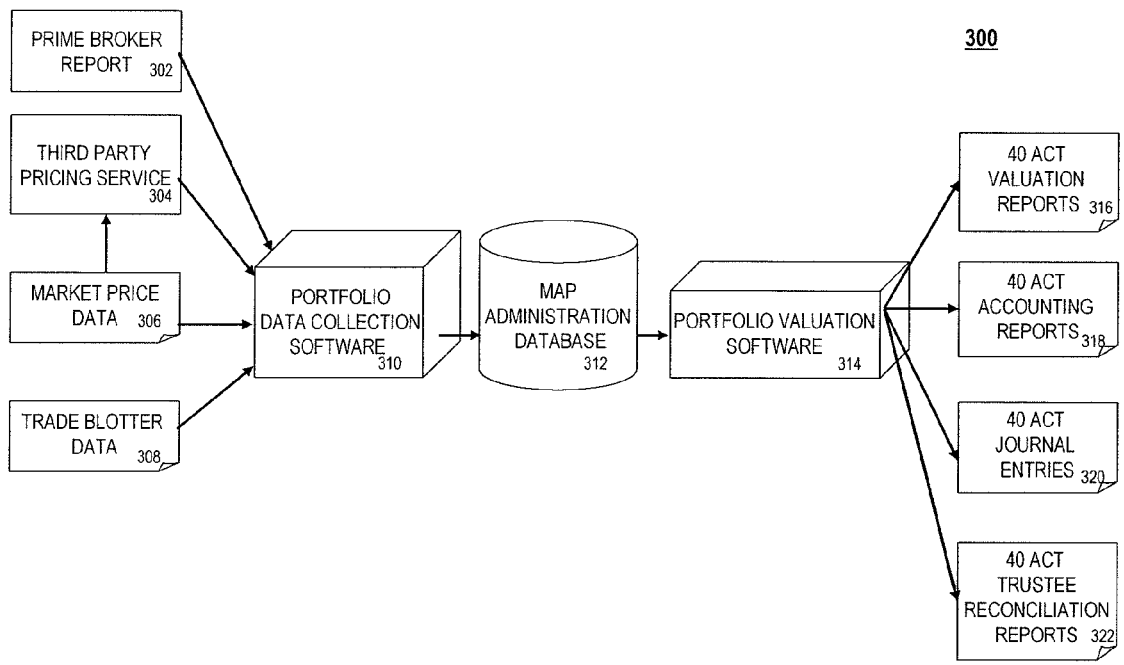
FIG. 3 depicts an exemplary diagram of an exemplary embodiment of a computer hardware and/or software system, network and plurality of computers and database(s) for managing, calculating net asset value, etc., from time to time in accordance with an exemplary embodiment of the present invention.

FIG. 3 depicts an exemplary diagram 300 illustrating an exemplary data processing system which may include, according to an exemplary embodiment, portfolio data collection software 310 which may receive, e.g., but not limited to, prime broker report data 302, market price data 306, which may be provided directly, or according to an exemplary embodiment, may be provided via a third party pricing service 304, and may receive a trade blotter. The portfolio data collection software 310, according to an exemplary embodiment, may be stored in a MAP administration database 312. MAP administration database 312 may provide data to portfolio valuation software 314, according to an exemplary embodiment. The portfolio valuation software 314, may provide any of a number of exemplary reports. According to an exemplary embodiment, portfolio valuation software 314, may provide 40 Act reports 316, 40 Act accounting reports 318, 40 act journal entries 320, and/or 40 Act Trustee reconciliation reports 322, according to an exemplary embodiment.

Using portfolio data collection front end software (and/or hardware) ("PDCFES") 310, according to an exemplary embodiment, may electronically collect data, e.g., but not limited to, daily, or otherwise, from various prime brokers 302 regarding current bond holdings, according to an exemplary embodiment. Market price data 306, according to an exemplary embodiment, may be transmitted electronically to, e.g., but not limited to, third party pricing services 304 and prices may be independently confirmed and may be transmitted electronically daily. Further, all current trading activity may also be transmitted electronically to the portfolio data collection software 310, according to an exemplary embodiment.

MAP Administration Database 312, according to an exemplary embodiment, may be used to collect, store and manage data collected from prime brokers 302, third party pricing services 304, and new trades 308, and may then be processed using the PDCFES 310, according to an exemplary embodiment, and may be transferred into the MAP Fund administration database 312, according to an exemplary embodiment, where the data may be compiled so that that the data can be electronically, using an exemplary computer system for example, reconfigured to provide the data needed to value both the RTCs 110, 206 and municipal bonds 106, 108, 201, 209 and any other securities 109, etc., owned and/or held by the MAP Fund 102, 207.

Portfolio Valuation and Report Software ("PVRS") 314, according to an exemplary embodiment, may then compute data, according to an exemplary embodiment, using the PVRS 314 to determine, e.g., but not limited to, daily (or other periodic, or a periodic, etc.) values of the RTCs 110, 206 and other related securities 106, 108, 201, 209, 109, etc., based upon, e.g., but not limited to, established pricing methodologies. The PVRS 314 may then, according to an exemplary embodiment, generate reports 316-322 that may be used for, e.g., but not limited to, daily valuation 316, accounting 318, journal entry 320 and/or trustee reconciliation 322, etc., purposes, according to an exemplary embodiment.

Figure 4:
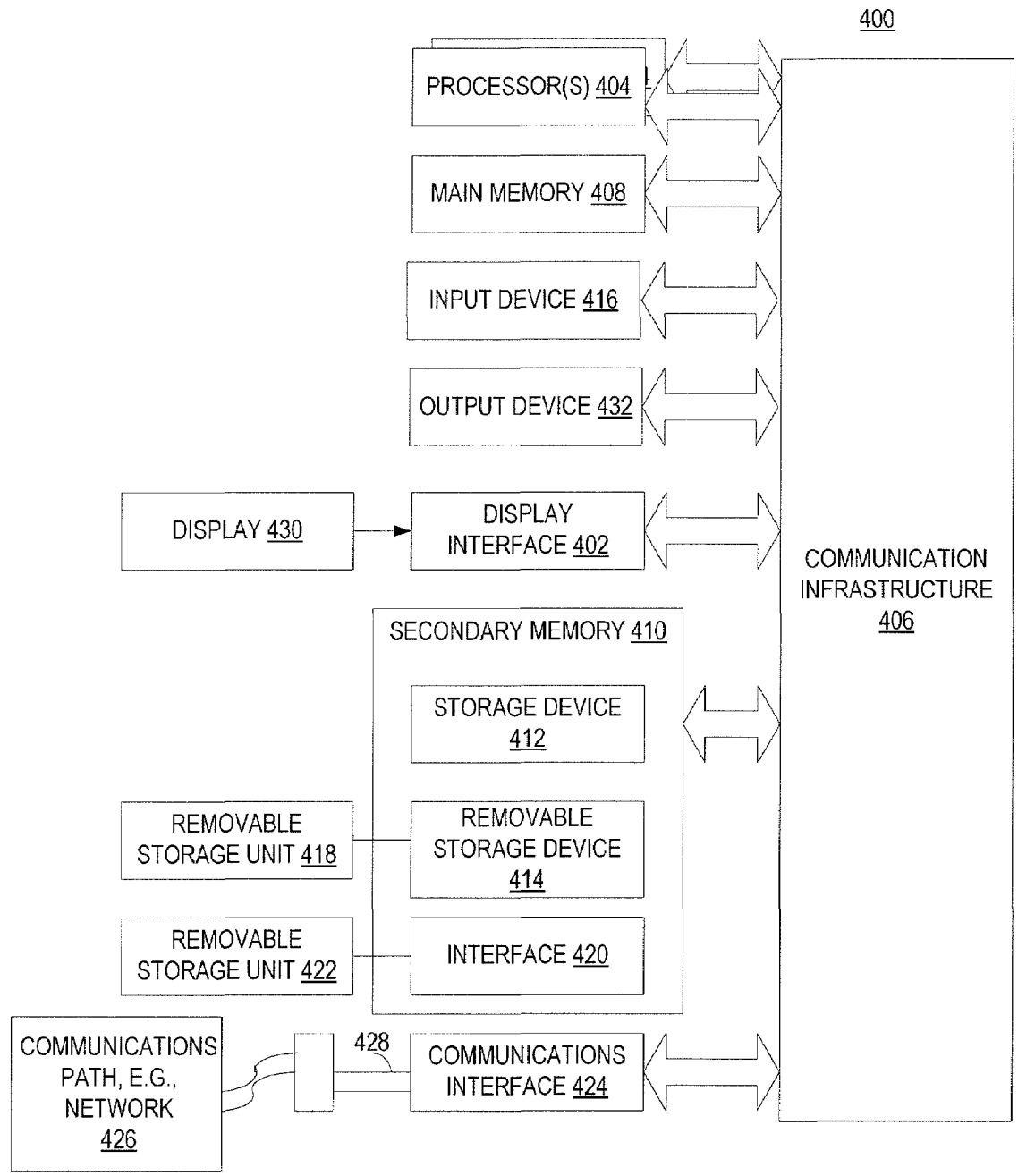
FIG. 4 depicts an exemplary embodiment of an exemplary computer hardware system platform as may be used in any of various exemplary computer systems according to an exemplary embodiment.

According to an exemplary embodiment, a computer hardware and/or software system 300 (not shown), 400, such as, e.g., but not limited to, FIG. 4, may be used to implement exemplary embodiments and may be used to perform among other functions, such as, e.g., but not limited to, calculations and computations including, e.g., but not limited to:

Daily portfolio monitoring and analysis;
Integration of multiple data sources into customized single reports;
Interfacing with multiple prime brokers;
Compliance Monitoring;
Compliance Reporting;
Compliance Oversight;
Calculating/computing Daily net asset value (NAV);
Performance reporting details; and/or
Margin to equity reporting.

FIG. 4 depicts an exemplary computer system that may be used in implementing an exemplary embodiment of the present invention. Specifically, FIG. 4 depicts an exemplary embodiment of a computer system 400 that may be used in computing devices such as, e.g., but not limited to, a client and/or a server, etc., according to an exemplary embodiment of the present invention. FIG. 4 depicts an exemplary embodiment of a computer system that may be used as client device 400, or a server device 400, etc. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 400 may be shown in FIG. 4, depicting an exemplary embodiment of a block diagram of an exemplary computer system useful for implementing the present invention. Specifically, FIG. 4 illustrates an example computer 400, which in an exemplary embodiment may be, e.g., (but not limited to) a personal computer (PC) system running an operating system such as, e.g., (but not limited to) MICROSOFT® WINDOWS® NT/98/2000/XP/CE/ME/VISTA, etc. available from MICROSOFT® Corporation of Redmond, Wash., U.S.A. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 400 may be shown in FIG. 4. Other components of the invention, such as, e.g., (but not limited to) a computing device, a communications device, mobile phone, a telephony device, a telephone, a personal digital assistant (PDA), a personal computer (PC), a handheld PC, an interactive television (iTV), a digital video recorder (DVD), client workstations, thin clients, fat clients, proxy servers, network communication servers, remote access devices, client computers, server computers, routers, web servers, data, media, audio, video, telephony or streaming technology servers, etc., may also be implemented using a computer such as that shown in FIG. 4. Services may be provided on demand using, e.g., but not limited to, an interactive television (iTV), a video on demand system (VOD), and via a digital video recorder (DVR), or other on demand viewing system.

The computer system 400 may include one or more processors, such as, e.g., but not limited to, processor(s) 404. The processor(s) 404 may be connected to a communication infrastructure 406 (e.g., but not limited to, a communications bus, cross-over bar, or network, etc.). Various exemplary software embodiments may be described in terms of this exemplary computer system 400. After reading this description, it may become apparent to a person skilled in the relevant art(s) how to implement the invention using other computer systems and/or architectures.

The computer system 400 may also include, e.g., but may not be limited to, one or more input devices 416, such as, e.g., but not limited to, a keyboard, mouse, touchscreen, stylus, a sensor, a gesture recognition device, a voice recognition device, a datastream, a datasource, and/or a data capture device, etc.

Computer system 400 may include one or more output devices 432, e.g., but not limited to, a display interface 402 that may forward, e.g., but not limited to, graphics, text, and other data, etc., from the communication infrastructure 406 (or, from a frame buffer, etc., not shown) for display on the display unit 430.

The computer system 400 may also include, e.g., but may not be limited to, one or more output devices 432, such as, e.g., but not limited to, a monitor, a display 430, a screen, touch screen, a television, a cathode ray tube (CRT), a liquid crystal display (LCD), a plasma panel, a printer, and/or any other output device 432, etc.

The computer system 400 may also include, e.g., but may not be limited to, a main memory 408, random access memory (RAM), and a secondary memory 410, etc. The secondary memory 410 may include, for example, (but not limited to) a hard disk drive 412 and/or a removable storage drive 414, representing a floppy diskette drive, a magnetic tape drive, an optical disk drive, a compact disk drive CD-ROM, a flash memory device, a storage device, etc. The removable storage device 414 may, e.g., but not limited to, read from and/or write to a removable storage unit 418 in any of various well known manners. Removable storage unit 418, also called a program storage device or a computer program product, may represent, e.g., but not limited to, a floppy disk, magnetic tape, optical disk, compact disk, etc. which may be read from and written to by removable storage drive 414. As may be appreciated, the removable storage unit 418 may include a computer usable storage medium having stored therein computer software and/or data. In some embodiments, a "machine-accessible medium" may refer to any storage device used for storing data accessible by a computer. Examples of a machine-accessible medium may include, e.g., but not limited to: a magnetic hard disk; a floppy disk; an optical disk, like a compact disk read-only memory (CD-ROM) or a digital versatile disk (DVD); a magnetic tape; a flash memory device; a storage device; and/or a memory chip, etc.

In alternative exemplary embodiments, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 422 and interfaces 420, which may allow software and data to be transferred from the removable storage unit 422 to computer system 400.

Computer 400 may also include an input device 416 such as, e.g., (but not limited to) a mouse or other pointing device such as a digitizer, and a keyboard or other data entry device (not shown).

Computer 400 may also include output devices, such as, e.g., (but not limited to) display 430, and display interface 402. Computer 400 may include input/output (I/O) devices such as, e.g., (but not limited to) communications interface 424, cable 428 and communications path 426, etc. These devices may include, e.g., but not limited to, a network interface card, and modems (neither are labeled). Communications interface 424 may allow software and data to be transferred between computer system 400 and external devices. Communications path 426 may be coupled to one or more other computer devices 400 via one or more networks 432, as will be apparent to those skilled in the relevant art.

In this document, the terms "computer program medium" and "computer readable medium" may be used to generally refer to media such as, e.g., but not limited to removable storage drive 414, a hard disk installed in hard disk drive 412, and signals 428, etc. These computer program products may provide software to computer system 400. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it may be appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

In yet another exemplary embodiment, the invention may be implemented using a combination of any of, e.g., but not limited to, hardware, firmware and software, etc.

In one or more embodiments, the present embodiments are embodied in machine-executable instructions. The instructions can be used to cause a processing device, for example a general-purpose or special-purpose processor, which is programmed with the instructions, to perform the steps of the present invention. Alternatively, the steps of the present invention can be performed by specific hardware components that contain hardwired logic for performing the steps, or by any combination of programmed computer components and custom hardware components. For example, the present invention can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present invention can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution).

Exemplary Communications Embodiments

In one or more embodiments, the present embodiments are practiced in the environment of a computer network or networks. The network can include a private network, or a public network (for example the Internet, as described below), or a combination of both. The network includes hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them called interprocess communication pathways.

On these pathways, appropriate communications protocols are used. The distinction between hardware and software may not be easily defined, with the same or similar functions capable of being preformed with use of either, or alternatives.

An exemplary computer and/or telecommunications network environment in accordance with the present embodiments may include node, which include may hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of subnetworks.

As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently.

In an exemplary embodiment, the processes may communicate with one another through interprocess communication pathways (not labeled) supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless e-mail devices including BLACKBERRY™ devices), document processing devices (such as scanners, printers, facsimile machines, or multifunction document machines), or complex entities (such as local-area networks or wide area networks) to which are connected a collection of processors, as described. For example, in the context of the present invention, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present invention, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include BlueTooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

The embodiments may be employed across different generations of wireless devices. This includes 1 G-4G, nG, etc., according to present paradigms. 1 G refers to the first generation wide area wireless (WWAN) communications systems, dated in the 1970s and 1980s. These devices are analog, designed for voice transfer and circuit-switched, and include AMPS, NMT and TACS. 2G refers to second generation communications, dated in the 1990s, characterized as digital, capable of voice and data transfer, and include HSCSD, GSM, CDMA IS-95-A and D-AMPS (TDMA/IS-136). 2.5G refers to the generation of communications between 2G and 3G. 3G refers to third generation communications systems recently coming into existence, characterized, for example, by data rates of 144 Kbps to over 2 Mbps (high speed), being packet-switched, and permitting multimedia content, including GPRS, 1xRTT, EDGE, HDR, W-CDMA. 4G refers to fourth generation and provides an end-to-end IP solution where voice, data and streamed multimedia can be served to users on an "anytime, anywhere" basis at higher data rates than previous generations, and will likely include a fully IP-based and integration of systems and network of networks achieved after convergence of wired and wireless networks, including computer, consumer electronics and communications, for providing 100 Mbit/s and 1 Gbit/s communications, with end-to-end quality of service and high security, including providing services anytime, anywhere, at affordable cost and one billing. 5G refers to fifth generation and provides a complete version to enable the true World Wide Wireless Web (WWWW), i.e., either Semantic Web or Web 3.0, for example. Advanced technologies may include intelligent antenna, radio frequency agileness and flexible modulation are required to optimize ad-hoc wireless networks.

As noted, each node includes one or more processes executable by processors 404 incorporated into the nodes. In a number of embodiments, the set of processes, separately or individually, can represent entities in the real world, defined by the purpose for which the invention is used.

Furthermore, the processes and processors need not be located at the same physical locations. In other words, each processor can be executed at one or more geographically distant processor, over for example, a LAN or WAN connection. A great range of possibilities for practicing the embodiments may be employed, using different networking hardware and software configurations from the ones above mentioned.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents. Finally, it will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. A computer-implemented method for administering a special purpose trust which includes one or more municipal bonds and administering payments of obligations of a plurality of securities issued by the special purpose trust, comprising:

administering, via a computer processor, a portfolio of securities, the portfolio comprising a First Security, a Second Security, and one or more municipal bonds, the First Security having been issued by the special purpose trust, wherein the First Security being funded at least in part by equity from a municipal arbitrage portfolio (MAP) Fund, the MAP fund being an entity subject to securities regulation oversight, the assets of the MAP Fund being managed by at least one fund manager, and the First Security provides a first series of payments to the MAP Fund, the Second Security having been issued by the special purpose trust, the Second Security results in a second series of payments to an investor or investors, and the one or more municipal bonds, being purchased, owned, and held by the special purpose trust, the one or more municipal bonds, generate income comprising at least one of interest or principal, the one or more municipal bonds having been purchased on instructions from the at least one fund manager or the MAP Fund, and having been purchased by using one or more step out transactions, and wherein at least one broker or the special purpose trust act only as principals for the benefit of the special purpose trust and not as agents for the MAP Fund, the MAP Fund being obligated to reimburse losses incurred by a third party liquidity provider (LP) as a result of performing the LP's obligation to purchase the Second Security upon tender by a holder, the MAP Fund is bound by at least one security agreement which comprises at least one of:

a reimbursement agreement between the LP and the MAP Fund, wherein the reimbursement agreement may include provisions that permit the LP to cause a sale of at least one of the municipal bonds, or a Second Trust which holds the First Security and other investment securities if shortfall criteria specified in the reimbursement agreement are not met for satisfaction of obligations, a shortfall swap agreement between the LP and the MAP Fund (or the Second Trust), wherein if the LP cannot recover losses of the LP from a sale of the municipal bonds underlying the special purpose trust that issued the First Security and the Second Security, the shortfall swap agreement requires the MAP Fund (or the Second Trust) to pay an amount to the LP equal to a shortfall, at least one tri-party agreement between the LP, the MAP Fund (or the Second Trust), and a financial intermediary approved by the LP and the MAP Fund, where the tri-party agreement includes provisions that permit the financial intermediary (or a custodian) to fulfill a role as trustee to enforce provisions of a reimbursement agreement or a shortfall swap agreement, for the benefit of the LP, or a non-recourse obligation of the MAP Fund, said administering of the portfolio of securities comprising:

(a) collecting data, via said computer processor, about the portfolio of securities-;

(b) receiving pricing information, via said computer processor, about the portfolio of securities from at least one of a prime broker, a trustee, or a third party pricing service;

(c) generating a valuation, via said computer processor, of the portfolio of securities based on the collected data and the received pricing information;

(d) determining a distribution of payments from the special purpose trust, via said computer processor, said distribution of payments comprising the first series of payments and the second series of payments, wherein the first series of payments and the second series of payments comprise said income from at least one of the interest or the principal from the one or more municipal bonds, said distribution of payments to the holders of the First Securities and the Second Securities based on the valuation, the collected data, and the received pricing information; and (e) reporting, via said computer processor, the valuation of the portfolio of securities.

2. The computer-implemented method of claim 1, wherein the MAP Fund hedges interest rate exposure, or risks inherent in the First Security and reimbursement obligations, using at least one of:

exchange traded futures exchange traded options,

U.S. Treasury obligations, swap agreements, or other derivatives.

3. The computer-implemented method of claim 1, wherein the First Security is a Residual Trust Certificate (RTC).

4. The computer-implemented method of claim 1, wherein the Second Security is a Floating Rate or Fixed Rate Trust Certificate.

5. The computer-implemented method of claim 1, wherein the Second Security may have a payment priority over the First Security with respect to the distribution of payments.

6. The computer-implemented method according to claim 1, wherein the pricing information received includes valuation data of the portfolio wherein the valuation of the portfolio is calculated using a method comprising:
  i) calculating or receiving an amortization and the income on the one or more municipal bonds beginning with a bond price;
  ii) determining, calculating, or receiving said interest income earned from the one or more municipal bonds;
  iii) allocating a portion of said interest income and any gain share to the Second Security in accordance with obligations between said special purpose trust and the Second Security;
  iv) allocating a second portion of said interest income to pay fees and expenses of said special purpose trust; and
  v) allocating any remaining of said income after said allocating of said (iii) and said (iv) and any gain and any loss of said value of each of the one or more municipal bonds, to the First Securities.

7. The computer-implemented method of claim 6, wherein said allocating of said (iii) comprises for the one or more municipal bonds, paying interest and principal on at least one of a periodic, aperiodic basis, accruing, or amortizing on a daily basis.

8. The computer-implemented method according to claim 1, further comprising at least one of:
  electronically collecting, daily, portfolio data regarding the one or more municipal bonds from at least one prime broker, trustee, or third party service;
  electronically collecting market prices data from at least one third party pricing service for independent pricing confirmation; or
  transmitting electronically the market prices and portfolio data to a portfolio data collection module.

9. The computer-implemented method according to claim 8, further comprising at least one of:
  processing said data collected from said at least one prime broker, the trustee, or said at least one third party pricing service;
  transferring said processed data into an administration database where said processed data is at least one of:
    compiled, or
    electronically reconfigured to provide data needed to determine distributions to at least one of:
      the First Securities,
      the Second Securities, or
      paying fees and expenses of the special purpose trust.

10. The computer-implemented method according to claim 9, further comprising:
  computing using a portfolio valuation and report module comprising at least one of:
    receiving values of the First Securities and other related securities based upon established pricing methodologies, on at least one of a daily basis, a periodic basis, or an aperiodic basis; or
    generating reports for at least one of:
      daily valuation,
      accounting,
      journal entry, or
      trustee reconciliation.

11. The computer-implemented method of claim 1 further comprising at least one of:
  providing periodic portfolio monitoring and analysis;
  providing aperiodic portfolio monitoring and analysis;
  providing daily portfolio monitoring and analysis;
  providing integration of multiple data sources into a customized single report;
  interfacing with multiple prime brokers;
  monitoring compliance;
  reporting compliance;
  providing compliance oversight;
  calculating net asset value (NAV);
  computing NAV;
  calculating daily NAV;
  computing daily NAV;
  calculating distributions;
  computing distributions;
  calculating daily distributions;
  computing daily distributions;
  providing performance reporting details; or
  providing margin to equity reporting.

12. The method of claim 1, wherein the method is computer-implemented, and wherein the method further comprises:
  providing reports to the MAP Fund;
  establishing the special purpose trust comprising: issuing the First Security funded at least in part by equity of the MAP Fund, the First Security providing a series of residual interest payments to the MAP Fund; issuing the Second Security that results in a series of distributions to a second investor or investors; and administering the one or more municipal bonds owned by the special purpose trust; and wherein the MAP Fund has an obligation to reimburse a third party liquidity provider (LP) for losses incurred by the third party LP incurred by performing the LP's obligation to purchase the Second Security upon tender by a holder, wherein said obligation to reimburse said losses is imposed based on values collected by a portfolio data collection software executed by the computer processor and valued by a portfolio valuation software executed by the computer processor.

13. The computer-implemented method of claim 1, wherein said receiving of said (b) comprises at least one of receiving values calculated at least one of periodically, daily, or based on a close of market security value.

14. The computer-implemented method of claim 1, wherein said reporting of said (e) comprises at least one of outputting by said computer, or storing in storage of said computer.

15. The method of claim 1, wherein the assets of the MAP fund have been provided by at least one of a MAP Fund investor or MAP Fund investors.

16. The method of claim 1, wherein the series of payments are provided from the special purpose trust to at least one of a tax exempt money market fund (MMF) or a MAP Fund for the benefit of at least one of a MMF investor, a MMF investors, a MAP Fund investor, or a MAP Fund investors.

17. A computer-implemented system for administering a special purpose trust which includes one or more municipal bonds and administering payments of obligations of a plurality of securities issued by the special purpose trust, comprising:
  means for administering, via a computer processor, a portfolio of securities, the portfolio comprising a First Security, a Second Security, and one or more municipal bonds,
    the First Security having been issued by the special purpose trust, wherein the First Security being funded at least in part by equity from a municipal arbitrage portfolio (MAP) Fund, the MAP fund being an entity subject to securities regulation oversight, the assets of the MAP Fund being managed by at least one fund manager, and the First Security provides a series of payments to the MAP Fund,
    the Second Security having been issued by the special purpose trust, the Second Security results in a series of payments to an investor or investors, and the one or more municipal bonds, being purchased, owned, and held by the special purpose trust, the one or more municipal bonds, generate income comprising at least one of interest or principal, the one or more municipal bonds having been purchased on instructions from the at least one fund manager or the MAP Fund, and having been purchased by using one or more step out transactions, and wherein at least one broker or the special purpose trust act only as principals for the benefit of the special purpose trust and not as agents for the MAP Fund, the MAP Fund is obligated to reimburse losses incurred by a third party liquidity provider (LP) as a result of performing the LP's obligation to purchase the Second Security upon tender by a holder, the MAP Fund is bound by at least one security agreement which comprises at least one of:

- a reimbursement agreement between a LP and the MAP Fund, wherein the reimbursement agreement may include provisions that permit the LP to cause a sale of at least one of the municipal bonds or a Second Trust which holds the First Security and other investment securities if shortfall criteria specified in the reimbursement agreement are not met for satisfaction of obligations,
- a shortfall swap agreement between the LP and the MAP Fund (or the Second Trust), wherein if the LP cannot recover losses of the LP from a sale of the municipal bonds underlying the special purpose trust that issued the First Security and the Second Security, the shortfall swap agreement requires the MAP Fund (or the Second Trust) to pay an amount to the LP equal to such shortfall,
- at least one tri-party agreement between the LP, the MAP Fund (or the Second Trust), and a financial intermediary approved by the LP and the MAP Fund, where the tri-party agreement includes provisions that permit the financial intermediary (or a custodian) to fulfill a role as trustee to enforce provisions of a reimbursement agreement or a shortfall swap agreement, for the benefit of the LP, or
- a non-recourse obligation of the MAP Fund, said means for administering of the portfolio of securities comprising:

collection means for collecting data, via said computer processor, about the portfolio of securities;

pricing means for receiving pricing information, via said computer processor, about the portfolio of securities from at least one of a prime broker, a trustee, or a third party pricing service;

valuation means for generating a valuation, via said computer processor, of the portfolio of securities based on the collected data and the received pricing information;

distribution means for determining a distribution of payments from the special purpose trust, via said computer processor, said distribution of payments comprising the first series of payments and the second series of payments, wherein the first series of payments and the second series of payments comprise said income from at least one of the interest or the principal from the one or more municipal bonds, said distribution of payments to the holders of the First Securities and the Second Securities based on the valuation, the collected data, and the received pricing information, said distribution means responsive to said collection means, said pricing means, and said valuation means; and reporting means for reporting, via said computer, the valuation of the portfolio of securities, said reporting means responsive to said distribution means.

18. The computer-implemented system of claim 17, wherein said valuation means comprises: a processor adapted to administer a plurality of assets comprising said securities, and adapted to manage portfolio data collection, receipt of portfolio valuation information, and reporting.

19. A computer program product embodied on a computer accessible medium comprising program logic which when executed on a processor enables the processor to perform a method for administering a special purpose trust which includes one or more municipal bonds and administering payments of obligations of a plurality of securities issued by the special purpose trust, the method comprising:

administering, via a computer processor, a portfolio of securities, the portfolio comprising a First Security, a Second Security, and one or more municipal bonds, the First Security having been issued by the special purpose trust, wherein the First Security being funded at least in part from equity by a municipal arbitrage portfolio (MAP) Fund, the MAP fund being an entity subject to securities regulation oversight, the assets of the MAP Fund being managed by at least one fund manager, and the First Security provides a series of payments to the MAP Fund, the Second Security having been issued by the special purpose trust, the Second Security results in a series of payments to an investor or investors, and the one or more municipal bonds, being purchased, owned, and held by the special purpose trust, the one or more municipal bonds, generate income comprising at least one of interest or principal, the one or more municipal bonds having been purchased on instructions from the at least one fund manager or the MAP Fund, and having been purchased by using one or more step out transactions, and wherein at least one broker or the special purpose trust act only as principals for the benefit of the special purpose trust and not as agents for the MAP Fund, the MAP Fund being obligated to reimburse losses incurred by a third party liquidity provider (LP) as a result of performing the LP's obligation to purchase the Second Security upon tender by a holder, the MAP Fund is bound by at least one security agreement which comprises at least one of:

- a reimbursement agreement between a LP and the MAP Fund, wherein the reimbursement agreement may include provisions that permit the LP to cause a sale of at least one of the municipal bonds, or a Second Trust which holds the First Security and other investment securities if shortfall criteria specified in the reimbursement agreement are not met for satisfaction of obligations,
- a shortfall swap agreement between the LP and the MAP Fund (or the Second Trust), wherein if the LP cannot recover losses of the LP from a sale of the municipal bonds underlying the special purpose trust that issued the First Security and the Second Security, the shortfall swap agreement requires the MAP Fund (or the Second Trust) to pay an amount to the LP equal to a shortfall;
- at least one tri-party agreement between the LP, the MAP Fund (or the Second Trust), and a financial intermediary approved by the LP and the MAP Fund, where the tri-party agreement includes provisions that permit the financial intermediary (or a custodian) to fulfill a role as trustee to enforce provisions of a reimbursement agreement or a shortfall swap agreement, for the benefit of the LP, or a non-recourse obligation of the MAP Fund, said administering of the portfolio of securities comprising:

(a) collecting data, via said computer processor, about the portfolio of securities;

(b) receiving pricing information, via said computer processor, about the portfolio of securities from at least one of a prime broker, a trustee, or a third party pricing service;

(c) generating a valuation, via said computer processor, of the portfolio of securities based on the collected data and the received pricing information;

(d) determining a distribution of payments from the special purpose trust, via said computer processor, said distribution of payments comprising the first series of payments and the second series of payments, wherein the first series of payments and the second series of payments comprise said income from at least one of the interest or the principal from the one or more municipal bonds, said distribution of payments to the holders of the First Securities and the Second Securities based on the valuation, the collected data, and the received pricing information; and (e) reporting, via said computer processor, the valuation of the portfolio of securities.

* * * * *